March 6, 1934.  R. WESTON  1,949,506
METHOD FOR MAKING RUBBER THREADS OR STRANDS
Filed July 27, 1931  3 Sheets-Sheet 1
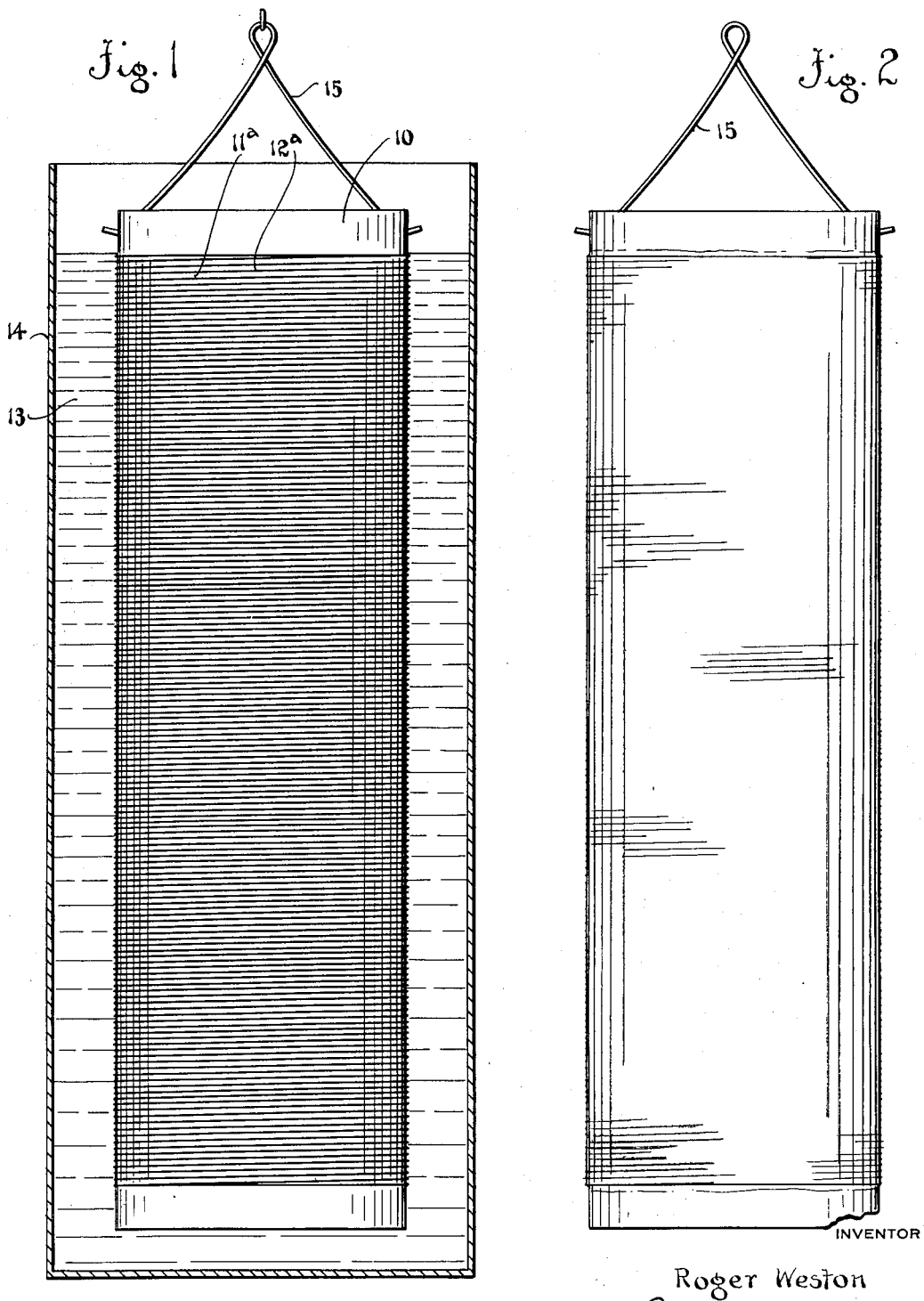
INVENTOR
Roger Weston
BY
Ely H Barrow
ATTORNEYS March 6, 1934.    R. WESTON    1,949,506

METHOD FOR MAKING RUBBER THREADS OR STRANDS

Filed July 27, 1931    3 Sheets-Sheet 2

INVENTOR
Roger Weston
BY
Ely H Barrow
ATTORNEYS

March 6, 1934.  R. WESTON  1,949,506
METHOD FOR MAKING RUBBER THREADS OR STRANDS
Filed July 27, 1931   3 Sheets-Sheet 3
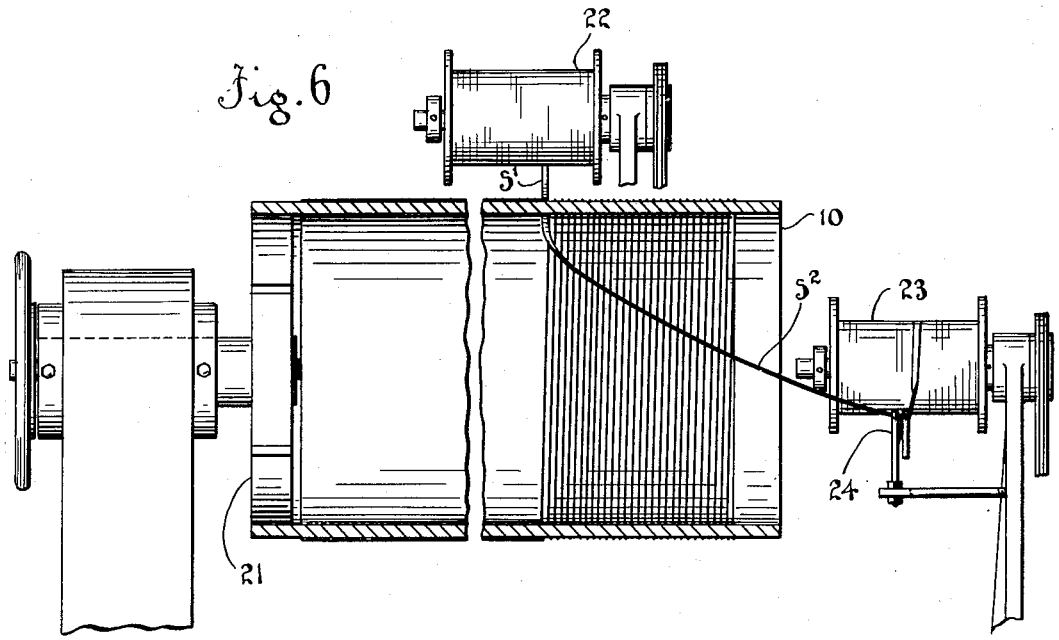
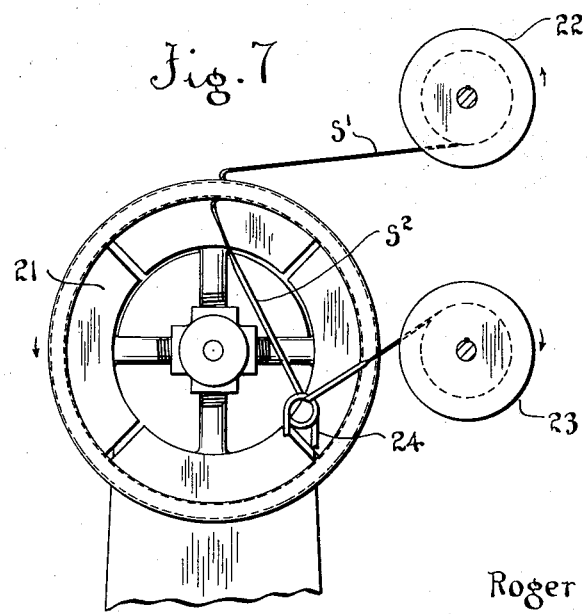
INVENTOR
Roger Weston
BY
Ely & Barrow
ATTORNEYS Patented Mar. 6, 1934

1,949,506

UNITED STATES PATENT OFFICE 1,949,506

METHOD FOR MAKING RUBBER THREADS OR STRANDS

Roger Weston, Cuyahoga Falls, Ohio, assignor, by mesne assignments, to Revere Rubber Company, Providence, R. I., a corporation of Rhode Island Application July 27, 1931, Serial No. 553,301

6 Claims. (Cl. 18—58)

This invention relates to methods for making rubber threads or strands.

Heretofore the usual process of making rubber threads or strands has been to mill crude rubber with vulcanizing and compounding ingredients to calender the milled rubber into a sheet and to cut the sheet into strands or threads.

The foregoing method is quite expensive, involving as it does the use of much skilled labor and high-priced equipment requiring considerable maintenance.

The general purpose of the present invention is to provide a method for making rubber threads or strands by a simple depositing or dipping operation and preferably utilizing liquid latex or the like including the desired vulcanizing ingredients and in either a raw or a vulcanized state.

The foregoing and other purposes of the invention are attained by the method illustrated in the accompanying drawings and described below. It is to be understood that the invention is not limited to the specific form thereof illustrated and described.

Of the accompanying drawings,

Figure 1 is a diametral section through a dipping tank illustrating a drum for making thread or strand rubber being dipped therein in accordance with the invention;

Figure 2 is an elevation of the drum after the dipping operation;

Figure 6 is a side elevation of equipment which may be used to reel the rubber strands from the drum; and Figure 7 is an end elevation thereof.

Figure 3:
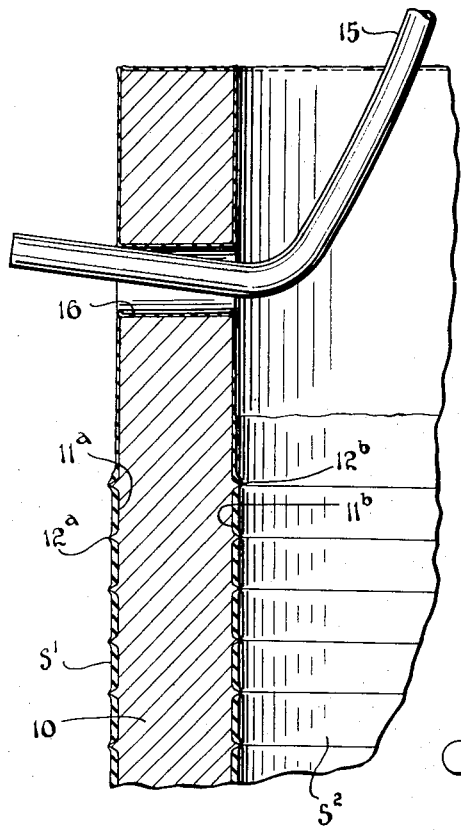
Figure 3 is an enlarged fragmentary section through the upper portion of the drum as shown in Figure 2.

Referring to the drawings, the numeral 10 designates a drum preferably of hollow cylindrical construction and formed with a continuous helical groove $11^a$ or $11^b$ preferably on each cylindrical surface, the convolutions of the groove being separated by a helical web $12^a$ or $12^b$ which may be comparatively sharp as shown. The groove $11^a$ or $11^b$ may be of any suitable cross-section such as that shown.

The drum 10 may be adapted to be suspended and dipped into a body 13 of latex or the like in a suitable tank 14 as by provision of a hangar 15 having arms engaging in apertures 16, 16 in the drum, the drum being provided with apertures 16 at both ends so that it may be reversely suspended and dipped.

In carrying out the method, the drum is dipped one or more times in each of reversed positions, the drum preferably being preliminarily heated to facilitate setting of the latex thereon upon withdrawal, whereby the rubber will deposit on the drum and evenly in the groove in which it collects, leaving a comparatively thin film of rubber over the sharp web $12^a$ or $12^b$.

The rubber is dried upon the form between each dipping and after the last dipping and may be vulcanized if raw latex is used or further vulcanized when vulcanized latex is used either by immersion in hot water or by subjection to the action of low temperature steam.

In making comparatively thin or light thread or strands, the convolutions of rubber lying in the groove $11^a$ or $11^b$ may be easily separated by merely winding the material from the drum. The film of rubber over the web $12^a$ or $12^b$ seems to be quite taut due to shrinkage of the rubber into the grooves upon drying and tears apart quite easily.

Figure 4:
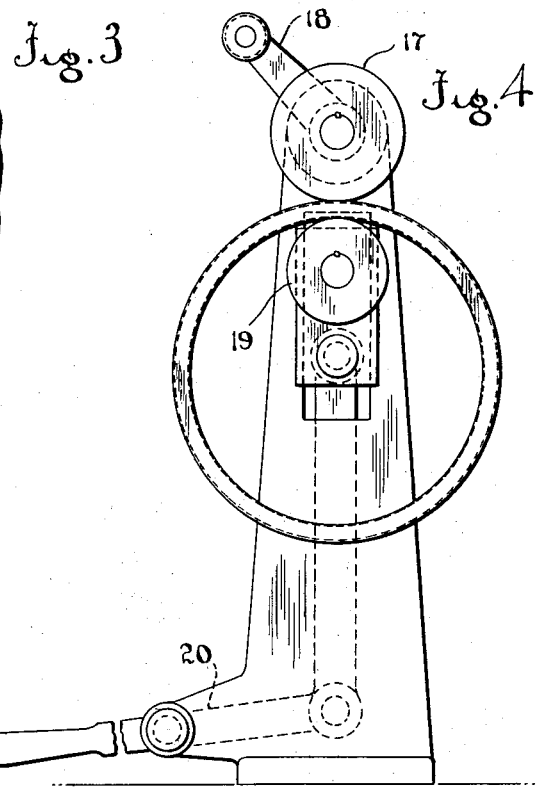
Figure 4 is a side elevation of suitable equipment for use in separating the convolutions of strand rubber formed on the drum where this is required.
Figure 5:
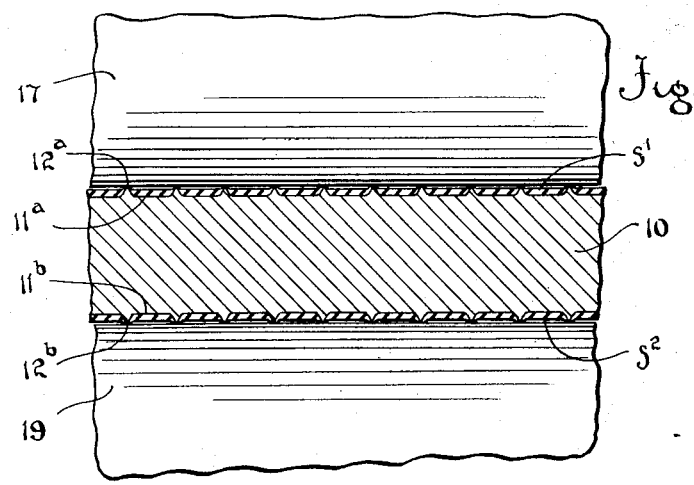
Figure 5 is an enlarged fragmentary view illustrating the action of the machine shown in Figure 4 in dividing the convolutions of the strand.

When heavier strand material is made, the convolutions may be separated prior to reeling from the drum by the use of equipment such as that illustrated in Figure 4. This includes an upper pressure roll 17 which may be driven by a crank 18 and a lower pressure roll 19 which may be urged toward roll 17 by a treadle mechanism 20, the drum 10 being slipped onto the lower roll as shown and pressed between it and the upper roll whereby upon rotation of the upper roll the drum will revolve between the rolls, the pressure of which will cause the film of rubber on the web $12^a$ or $12^b$ to be cut through by the sharpened webs.

The rubber strands may be reeled from the drum 10 as illustrated in Figures 6 and 7, the drum being mounted on a suitable chuck 21 driven by suitable means (not shown), the outer strand S' being reeled onto a reel 22 and the inner strand $S^2$ being reeled onto a reel, the latter 23 being guided through a suitable loop 24 to reel 23.

While it is preferred to deposit the rubber from a liquid onto drum 10 by dipping, it will be understood that it is within the scope of the present invention to deposit the rubber thereon by spraying, coagulation, electro-deposition or other suitable coating methods.

Modifications of the invention other than those suggested herein may be resorted to without departing from the spirit thereof or the scope of the appended claims.

What is claimed is:—

1. That method for making strand rubber which comprises depositing rubber from a liquid onto a surface formed with a continuous groove and having comparatively sharp edges between the convolutions thereof whereby the rubber collecting in said groove will form a continuous strand and the rubber deposited over said sharp edges will be easily divisible to separate the convolutions of rubber in said groove, and pressing an element against said sharp edges to separate said convolutions.

2. That method for making strand rubber which comprises depositing rubber from a liquid on a drum having a helical groove on its surface in which the rubber collects to form a continuous strand and having a helical, comparatively sharp web between the convolutions of said groove over which the rubber deposits thinly whereby the convolutions of said strand are easily separable, and pressing an element against said sharp edges to separate said convolutions.

3. That method for making strand rubber which comprises depositing rubber from a liquid onto a surface formed with a continuous groove and having comparatively sharp edges between the convolutions thereof whereby the rubber collecting in said groove will form a continuous strand and the rubber deposited over said sharp edges will be easily divisible to separate the convolutions of rubber in said groove, vulcanizing the rubber on said surface, and pressing an element against said sharp edges to separate said convolutions.

4. That method for making strand rubber which comprises depositing dubber from a liquid on a drum having a helical groove on its surface in which the rubber collects to form a continuous strand and having a helical, comparatively sharp web between the convolutions of said groove over which the rubber deposits thinly whereby the convolutions of said strand are easily separable, vulcanizing the rubber on said surface, applying rolling pressure to the sharp web to sever the convolutions of the strand.

5. That method for making strand rubber which comprises depositing rubber in tubular form from a liquid with convolutions of comparatively thick rubber about the tube which are connected together by comparatively thin rubber, vulcanizing the rubber, and pressing an element against the thin portions, thus dividing the tube at the thin portions to separate the convolutions.

6. That method of making strand rubber which comprises depositing rubber from a liquid in film form, said film in transverse cross section having closely spaced projections of rubber which are connected together by comparatively thin rubber portions, and pressing an element against the thin portions to separate the projections and form strand rubber thereby.

ROGER WESTON.